UNITED STATES PATENT OFFICE.

THOMAS LOWRY LEE, OF MEMPHIS, TENNESSEE, ASSIGNOR OF ONE-HALF TO GRAHAM STEARNS, EDGAR LEE, AND THOMAS L. LEE, JR., OF MEMPHIS, TENNESSEE.

PAINT.

SPECIFICATION forming part of Letters Patent No. 701,743, dated June 3, 1902.

Application filed January 13, 1902. Serial No. 89,533. (No specimens.)

*To all whom it may concern:*

Be it known that I, THOMAS LOWRY LEE, of Memphis, in the county of Shelby and State of Tennessee, have invented a new and useful Improvement in Paint Compounds, of which the following is a specification.

My invention is designed to provide a cheap, durable, and efficient paint compound especially adapted for painting heavy structures, such as bridges, roofs, derricks, and all kinds of heavy machinery where black is not objectionable; and it consists in the special composition of ingredients prepared in the manner and proportions hereinafter described.

The standard composition consists of three parts, by bulk, distilled coal-tar; one part, by bulk, dead-oil; one part, by bulk, refined benzol, one hundred per cent.; one part, by bulk, Chickasaw ocher.

If a thicker composition is desired, a larger proportion of the coal-tar may be used—say four parts instead of three—in the above formula.

There are special reasons for employing the above-named ingredients, whose characteristics I will now more fully describe. By the term "distilled coal-tar" I mean the residual tar that remains after the light oil or crude benzol and also the dead-oil have been driven off by distillation. The crude benzol is the first product which is volatilized, and this is lighter than water. The dead-oil is the next product to be distilled off, and this is heavier than water. The crude benzol, however, cannot be conveniently used in my paint composition, because it contains so large a proportion of ammonia as to be very objectionable to the workman in applying the paint. I therefore employ the refined benzol, whereby I get rid of the fiery and pungent odor, and thus get a drier that is free from objection and one that gives the paint a fine gloss. The Chickasaw ocher is a special product recently found in the State of Arkansas and prepared at a mill in Memphis, Tennessee. It has a special value with the coal-tar as a pigment to give body and elasticity to the paint and acts also as a drier.

To mix the ingredients, the ocher is first taken up by mixing it with the dead-oil and the benzol. This I prefer to allow to stand over night. After thus standing for some hours the coal-tar is added, and the whole is stirred to a homogeneous consistency.

This paint works well on metal, wood, canvas, or paper and for roofs has no superior.

Having thus described my invention, what I claim as new, and desire to secure by Letters Patent, is—

The herein-described paint composition consisting of distilled coal-tar, dead-oil, refined benzol, and Chickasaw ocher, mixed in or about the proportions described.

THOMAS LOWRY LEE.

Witnesses:
 W. H. MOORE,
 W. H. MOORE, Jr.